Sept. 3, 1940. H. R. LANGE 2,213,708

REFLECTING LENS UNIT

Filed March 11, 1938

Inventor.
Herbert R. Lange.
By Amro Thiess Olson & Mecklenburger
Attys.

Patented Sept. 3, 1940

2,213,708

UNITED STATES PATENT OFFICE 2,213,708

REFLECTING LENS UNIT

Herbert R. Lange, Chicago, Ill.

Application March 11, 1938, Serial No. 195,265

5 Claims. (Cl. 88—82)

This invention relates to improvements in reflecting lens units and their mountings adapted to be employed in signs, indicators and the like.

Many difficulties have been experienced in the use of illuminated signs along highways, intersections, railroad crossings and like exposed places employing reflecting lens units. An important difficulty is the formation of moisture and frost upon the reflective surface or mirror of these units in cold weather, which destroys the light reflective properties of this surface and renders the units useless. On the other hand, this exposed use and accessibility along highways have made these signs the object of frequent destruction by those on the highways. Usually, these units are made of glass and their fragile nature renders them easily broken. On the other hand, the construction employed has made these units readily removable, and therefore, they have been the object of vandalism usually more or less for the effect obtained by distorting the reading matter upon the sign through the removal of one or more characters. To overcome moisture and frost formation upon the reflective surface, various forms or types of hermetical seals or joints have heretofore been proposed but these have produced expensive and impractical structures that are capable of being easily broken and removed. Moreover, a construction of these units that will not admit of ready rearrangement of the characters upon the sign panel requires the added expense of a new sign panel each time a new advertisement is used.

An object of this invention is to provide an improved sign structure of the character described that will effectively overcome these difficulties by the provision of a simple, inexpensive and rugged construction of reflecting lens unit that is not readily destroyed by changing weather conditions and will readily withstand the abusive treatment of those on the highways attempting to break or remove portions of the sign.

More specifically the present invention is directed to a new and improved construction that seals the reflective surface or mirror in a body molded of a plastic material having approximately the same index of refraction as glass, but which is not as fragile and will not break or fracture by a blow directed thereagainst. The arrangement of the reflective surface or mirror with respect to the mounting for each sign and the molding of this plastic material thereupon provides a structure in which the hermetical seal is inherent and, therefore, eliminates all added parts, including cement, heretofore provided in an effort to exclude moisture and preserve this surface. The invention proposes to provide the mounting member as the shank of each unit upon which the body has been molded, the reflecting surface or mirror constituting or serving as the head of the shank about which the plastic material is formed in a substantial manner to provide strength and durability, each unit being produced at substantially a fraction of the cost of each unit heretofore employed.

It is, therefore, the purpose of the present invention to construct each character, letter or unit in the form of a molded body of material that is not as fragile as glass, will not fracture or break as readily as glass, but will have the same index of refraction and be better capable of withstanding weather changes without being damaged thereby.

Broadly, the present invention contemplates molding each character, letter or unit as an integral body, preferably of a material having the same or similar characteristics of cellulose acetate or the like, certain of such similar materials being known commercially as "tenite" and "lucite."

The integral body may be molded by processes employing, for instance, injection molding under high pressures that assures proper formation and secures an interlocking relation between the reflective surface, the fastening device or mounting upon which it is carried, and the body itself. The fastening device may be a shank of a screw or bolt protruding from the body. Hence, each unit will be simple, rugged and inexpensive.

Such a construction has certain obvious structural advantages over the use of glass, and is less expensive to produce. Glass is exceptionally fragile and fractures easily and cannot be molded and used in the same manner. Mounting glass units in the manner disclosed herein would create certain stresses that will readily fracture the glass, and thus destroy the inherent seal provided by the type of construction disclosed. Moreover, such molding operations would be more expensive and less certain. Obviously, glass will not as readily lend itself as the aforesaid material and will not provide a unit of the same low cost and wide adaptability for highway road signs and indicators.

It is to be understood that features inherent in the structure disclosed herein are capable of general embodiment in indicators, symbols, signals, letters, decorative designs with or without lettering or the like, and consequently, are not to be limited in their use to a structure known as a sign in the ordinary meaning of the term.

Other objects and advantages will be apparent from the following detail description when taken in connection with the accompanying drawing forming a part hereof.

Figure 1:
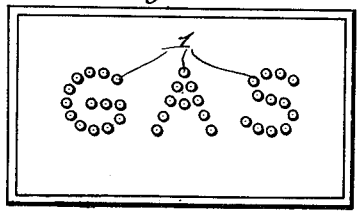
Figure 1 illustrates a sign having its advertising matter in the form of light reflecting units that embody the present invention.

As illustrated in the drawings, a sign embodying my invention may be mounted so that the light reflected from the headlights of approaching vehicles will illuminate the sign and provide a very effective and attractive display. The sign is also constructed for use during the day, the light rays striking the display in like manner so that there will be provided an effective and attractive display.

Figure 7:
Fig. 7 illustrates a sign panel wherein each character or unit embodying the present invention is made in the form of a letter.

However, it will be understood that the sign may be used for different purposes, and accordingly, its use is not limited to highways or intersections. Figs. 1 and 7 illustrate two different signs embodying the present invention. The sign shown in Fig. 1 employs buttons that are used to outline the advertising material on the sign. The sign illustrated in Fig. 7 uses letters mounted directly against the panel. I shall first describe, however, the button construction illustrated in Figs. 1 to 6, inclusive.

Figure 2:
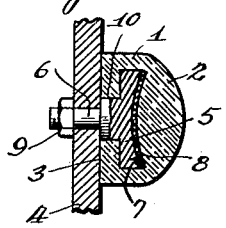
Fig. 2 is a vertical section, along line 2—2 of Fig. 3, of one of said buttons to illustrate in detail the invention herein disclosed.
Figure 3:
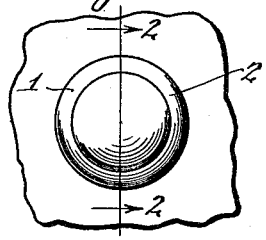
Fig. 3 is a face view of the button.

Each button or reflecting unit consists of a molded body 1 having a spherical convex front face 2 constituting the objective end of the lens thus formed and a rear surface 3 which, as shown in Fig. 2, may be made substantially flat to engage tightly against sign panel 4, but which may be of any desired shape or form, depending upon the particular adaptation or use of the unit. In other words, the present invention is preferably not to be limited to any particular shape or contour of body 1. A head 5, which is a part of a fastening member having a shank 6, is embedded in body 1. The front face 7 of head 5 is preferably concave and is provided with a mirrored or reflective surface 8. Mirrored or reflective surface 8 is likewise not to be limited as to shape or construction, because any design or arrangement of the mirrored surface may be used.

Figure 4:
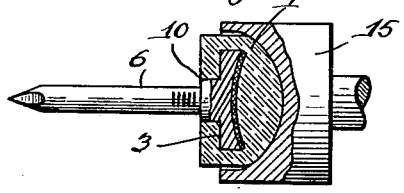
Fig. 4 is a sectional view similar to Fig. 2 but illustrating a different form of fastening member and the manner in which these buttons may be driven into or fastened upon the sign panel.
Figure 9:
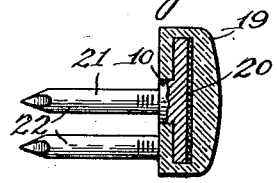
Fig. 9 is a vertical sectional view taken on line 9—9 of Fig. 8.
Figure 10:
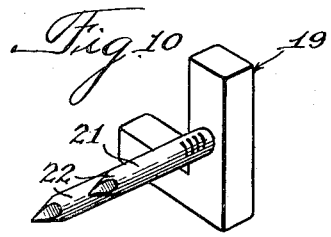
Fig. 10 is a perspective view of the same letter to illustrate how the head of the fastening members is imbedded in the body and the shanks project therefrom.
Figure 5:
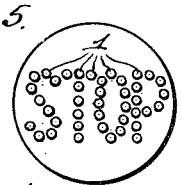
Fig. 5 illustrates the usual stop sign employing buttons and embodying the invention disclosed herein.
Figure 6:
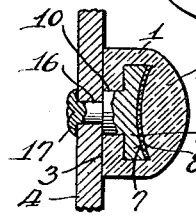
Fig. 6 is a view similar to Fig. 2 but showing a different form of fastening member.

Shank 6 is reduced in diameter and may terminate in one of many different forms, as shown in Figs. 2, 4 and 6. The end may be threaded and held by a nut 9, as illustrated in Fig. 2, or it may be shaped as a nail, as illustrated in Fig. 4, or it may be formed as a rivet member, as illustrated in Fig. 6.

I preferably mold body 1 out of material that is less fragile than glass but has the characteristics of being slightly resilient so as to yield to a blow without fracturing or breaking and possessing the same index of refraction as glass. I mention cellulose acetate as one example of material that may be readily used, and also refer particularly to substances commercially known as "tenite" and "lucite". The fastening member may be placed in the mold so that the head 5 will be properly located within the cavity and this material injected into the cavity under relatively high pressure. In certain instances, pressures as high as fifteen tons are employed, thereby assuring a uniform and complete injection and a perfect product. A shoulder 10 is provided on shank 6 and is embedded in body 1 for the purpose of preventing the material from being forced out of the mold cavity along shank 6 during the molding operation. Shoulder 10 also serves the purpose of keeping head 5 centered in the mold cavity. A perfect bond is formed between the material, head 5 and shoulder 10. This bonding action causes the material to grip the head 5 and shoulder 10 tightly, and effectively prevents any relative rotation or movement between these parts. It seems that performing the molding operation under relatively high pressures assures such a tight bonding action of the material, which advantageously maintains the desirable seal preventing exposure of surface 8 to the atmosphere. Axial displacement between body 1 and fastening member 6 is prevented by the enlarged head.

The characteristic of resiliency or ability to yield to a blow without fracturing has an additional benefit in connection with the light reflecting units disclosed herein. A mallet 15, having a face cooperating with the convex surface 2 of body 1, may be used to drive these units into position on the sign panel where a fastening element may be in the form of a nail or spike, as illustrated in Fig. 4. This characteristic of the material further prevents destruction of these units by those on the highway using them as targets. To overcome vandalism, a fastening member may be formed to prevent quick removal and still provide a structure that may be easily mounted and readily removed by the proper implements. To illustrate, the shank of the fastening member may be made in the form of a short rivet member 16 that can be readily turned over at its end to form a rivet head 17. Shank 6, shown as a nail in Fig. 4, may likewise be provided with means along its surface (not shown) that will prevent it being readily withdrawn from the sign panel.

It will be noted that the shank 6 or 16 of the fastening member is relatively small in diameter. It will, therefore, not require making large openings in the sign panel and it will not prevent the use of the same sign panel if a rearrangement of the units thereupon to form different advertising matter is desired. This eliminates the present requirement of replacing the entire sign panel when the contract on a particular advertisement has expired and new matter is to replace the old advertisement.

Figs. 7 to 10, inclusive, illustrate the manner in which the units may be made in the form of letters 19 or like characters. The head 20 of the fastening member, designated broadly as 21, may have a number of shanks 22 that enter or penetrate the sign panel to hold the letter in position. Thus, the arrangement or construction of the fastening member with respect to its head and shanks may be readily varied in accordance with the design, size or shape of the character in which it is embodied. Head 20 may be readily embedded within each letter 19 and as many fastening members 21 may be used as will be necessary for the size of the letter. There is no limit as to the size of each letter produced. Size is not a limitation with respect to the benefits and advantages to be obtained from the construction herein disclosed. In the case of glass characters, larger letters or characters increase the expense from two standpoints. The percentage of breakage in manufacture and handling increases. The risk of breakage by rocks or missiles hurled thereat by those along the highway is proportionately greater. Inasmuch as manufacturing costs are greater and the risk of breakage by vandalism is greater, the expense of larger glass characters and their maintenance make these outdoor signs somewhat impractical and very expensive to the users. Characters 19 may be formed, however, in any size and the only added expense is in the amount of material used. Breakage is negligible. It is not an element to be regarded in the cost of manufacture. Likewise, breakage of the characters upon sign panels along the highways is reduced.

Figure 8:
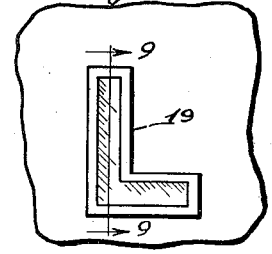
Fig. 8 is an enlarged face view of one of the letters.

From the foregoing description it is obvious that the sign herein described may be used for day and night service and that it will effectively reflect the light and thus provide a brilliant and attractive display. The permanency and durability of the characters or letters will be apparent from the type of construction employed. Unlike prior art devices, no special design or added material is employed to secure a hermetical seal for the mirrored or light reflective surface 8. Merely embedding head 5 of the fastening member in body 1, this being performed in a single molding operation, effectively holds mirrored surface 8 hermetically sealed and effectively excludes moisture, and thereby prevents temperature changes from causing condensation, formation of frost or other effects destructive to or hampering the light reflective qualities thereof. Mounting each character individually, as shown in Fig. 8, tends to novelly accentuate the outline thereof so as to make the sign, as a whole, a very effective display. Individually mounting the characters, while not essential to the invention, assures a simple and an expedient construction preventing the elements from gaining access to mirrored surface 8 and destroying the reflectivity thereof. The characters may be in script or otherwise in one word, or as a unit symbol when employing certain features of the invention, it being understood that the novel characteristics, as herein disclosed of a light reflective unit may be adapted to different types and designs of indicators, signs, etc. By the term "sign," as used herein, I refer to any structure whether decorative or not, which may or may not have lettering, designs, characters or symbols thereon, but which will embody the principle of construction shown and described herein.

I find that remarkable results are obtained both from the standpoint of simplicity and economy in constructing body 1 of the type of material referred to herein and providing the mirrored surface 8 upon the head of the fastening member which is embedded in the molding operation. It is impossible for the hermetical seal that inherently results from providing the mirrored surface upon the head of the fastening member and embedding this head in the molding operation, to expose this mirrored surface to the atmosphere. Moreover, the arrangement of the fastening member in the manner described permits shanks of relatively small diameters to be the only portion of a fastening means that need enter the sign panel.

Without further elaboration, the foregoing will so fully explain the gist of my invention that others may, by applying current knowledge, readily adopt the same for use under varying conditions of service, without eliminating certain features, which may properly be said to constitute the essential items of novelty involved, which items are intended to be defined and secured to me by the following claims.

I claim:

1. A reflecting lens unit comprising a molded transparent body of plastic material having the property of setting without becoming fragile, a head provided with a mirrored surface, said head being embedded in said molded body with said mirrored surface hermetically sealed therein, and a reduced fastening member fixed to said head and extending outwardly through said body from said head, said body completely enclosing said head and embedding therein that portion of said member which connects to said head.

2. A reflecting lens unit comprising a molded transparent body of plastic material having the property of setting without becoming fragile and having a front face, a fastening member for said body extending outwardly therefrom at the rear thereof, an enlarged head upon the inner end of said fastening member, said head being embedded in said body, and a mirrored surface in opposition to said front face of said body, said mirrored surface being carried upon said head and hermetically sealed within said molded body.

3. A reflecting lens unit comprising a molded transparent body of plastic material having the property of setting without becoming fragile, a mirrored surface embedded a distance within said molded body, and a fastening member upon which said mirrored surface is carried having a portion thereof likewise embedded in said molded body, said fastening member having a part extending outwardly from said body at one side thereof, said part being integrally formed with said embedded portion carrying said mirrored surface.

4. A reflecting lens unit comprising a molded transparent body of plastic material having the property of setting without becoming fragile, an enlarged head having a mirrored surface, said head and mirrored surface being molded in said body and thereby embedded therein to provide a hermetical seal formed by said body surrounding said head and said mirrored surface, and a fastening member fixed to said head extending outwardly from said body.

5. A reflecting lens unit comprising a molded transparent body of plastic material having the property of setting without becoming fragile, a mirrored surface, and means for carrying said mirrored surface embedded within said body, said means including a mounting member projecting from said body, said body being compressed about and substantially enclosing said mirrored surface and a portion of said means to provide thereby a permanently formed hermetical seal for said mirrored surface.

HERBERT R. LANGE.